US007275044B2

(12) United States Patent
Chauvin et al.

(10) Patent No.: US 7,275,044 B2
(45) Date of Patent: *Sep. 25, 2007

(54) SYSTEM, METHOD AND SOFTWARE PRODUCT FOR ORDERING IMAGE PRODUCTS OVER A COMMUNICATION NETWORK FROM A PLURALITY OF DIFFERENT PROVIDERS HAVING VARIOUS BUSINESS RELATIONSHIPS

(75) Inventors: Lou Chauvin, Webster, NY (US); Howard E. Bussey, Pittsford, NY (US); Christopher M. Dobbs, Rochester, NY (US); Kenneth A. Parulski, Rochester, NY (US); Timothy G. Thompson, Delevan, NY (US); John A. Foster, Pittsford, NY (US); Pamela J. Gotham, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 403 days.

This patent is subject to a terminal disclaimer.

(21) Appl. No.: 10/051,338

(22) Filed: Jan. 18, 2002

(65) Prior Publication Data
US 2003/0040983 A1 Feb. 27, 2003

Related U.S. Application Data

(63) Continuation-in-part of application No. 09/939,369, filed on Aug. 24, 2001.

(60) Provisional application No. 60/314,135, filed on Aug. 22, 2001.

(51) Int. Cl.
*G06Q 30/00* (2006.01)
(52) U.S. Cl. .......................................... 705/26; 705/27
(58) Field of Classification Search ............. 705/26–27
See application file for complete search history.

(56) References Cited

U.S. PATENT DOCUMENTS 6,351,738 B1 * 2/2002 Clark .......................... 705/37

FOREIGN PATENT DOCUMENTS

WO 0057332 * 9/2000

OTHER PUBLICATIONS

Kodak: "Kodak and LightSurf Collaborate on Kodak Picture Center; Online Photography Leader Launches Retailer-based Photo Sharing Community Powered by LightSurf," M2 Presswire, Jun. 28, 2000, 3pgs, Proquest #55610320.*

(Continued)

*Primary Examiner*—Robert M. Pond
(74) *Attorney, Agent, or Firm*—Frank Pincelli

(57) ABSTRACT

The present invention is directed to a system, method, and software product for ordering of digital photo services over a communication network among a plurality of photo service providers from a plurality of order terminals, each of the order terminals being associated with a one of a plurality of business entities. The method includes maintaining information with respect to business relationships between the photo service providers and the plurality of business entities and providing an offering at one or more of the plurality of order terminals based on the business relationships associated with the one or more of the order terminals.

15 Claims, 13 Drawing Sheets

OTHER PUBLICATIONS

Kodak: "CVS and Kodak Launch Co-Branded Online Photo Service: The CVS Photo Center Featuring Kodak Picture Center Online at CVS.com," Business Wire, Jun. 27, 2000, 3pgs, Proquest #55519660.*

PictureVision: "PictureVision and PhotoPoint Agreement Combines Benefits of Kodak PhotoNet Online and PhotoPoint.com," Business Wire, Jul. 26, 2000, Proquest 56947402, 3pgs.*

Rex, Erica; "Online Photo Delivery," Upside, Jun. 2000, v12,i6pg331, Proquest #53890764, 7pgs.*

PRN: "General Growth Propertis Delivers on Retail Convergence Strategy," PR Newswire, Aug. 1, 2000, Proquest #57307427, 3pgs.*

PhotoChannel: "PhotoChannel & Genuity agree to launch open, global digiatl iamging network," Canada Newswire, Nov. 1, 2000, Proquest #63074516, 4pgs.*

PhotoChannel: "PhotoChannel Networks Inc. announces that wolfxpress.com to join the PhotoChannel Network," 65975731, Canada Newswire, Jan. 4, 2001, Proquest # 65975731, 3pgs.*

PhotoChannel: "North America's leading independent photo specialty retail cooperative group selects PhotoChannel Networks Inc. to deploy PRO imaging network," Canada Newswire, Jan. 22, 2001, Proquest # 67161238, 3pgs.*

PhotoChannel: "PhotoChannel Networks Inc. announces new features with the launch of PhotoSite and Albums," PR Newswire, Dec. 19, 2000, Proquest # 65290699, 3pgs.*

UU: PhotoChannel: "PhotoChannel Networks Inc. to power online photo store for HotJobs.com's new college channel," Canada Newswire, Dec. 18, 2000, Proquest # 65261802, 3pgs.*

VV: PhotoChannel: "PhotoChannel announces international delivery or prints to over 200 countries," Canada Newswire, Dec. 11, 2000, Proquest # 65094914, 3pgs.*

* cited by examiner

| PROVIDER | NAME | SERVICE | ENTITY A | ENTITY B | ENTITY C | ENTITY D |
|---|---|---|---|---|---|---|
| #1 | RETAILERA.COM | PRINTING | D | X | N | F |
| #2 | RETAILERB.COM | PRINTING | X | D | N | X |
| #3 | FOTO.COM | PRINTING | N | N | F | D |
| #4 | FRAMES_R_US | FRAMED PRINTS | F | N | N | N |
| #5 | PICTURES.COM | FRAMED PRINTS | N | F | N | N |

BUSINESS RELATIONSHIPS

RELATIONSHIPS:
D = DOMESTIC
F = FRIENDLY
N = NEUTRAL
X = HOSTILE

FIG. 5

```
                           ┌─242
                    ORDER PRINTS

FOTO.COM PRINTS BY MAIL
                 MAILED IN 48 HOURS
               $0.30 PER PRINT
            RETAILER A IN-STORE PICK-UP
                $0.40 PER PRINT
                   2-DAY SERVICE
```

*FIG. 6D*

SYSTEM, METHOD AND SOFTWARE PRODUCT FOR ORDERING IMAGE PRODUCTS OVER A COMMUNICATION NETWORK FROM A PLURALITY OF DIFFERENT PROVIDERS HAVING VARIOUS BUSINESS RELATIONSHIPS

CROSS-REFERENCE TO RELATED APPLICATION

This is a Continuation-In-Part application of U.S. Ser. No. 09/939,369; filed Aug. 24, 2001; titled SYSTEM, METHOD AND SOFTWARE PRODUCT FOR ALLOWING A CONSUMER TO ORDER IMAGE PRODUCTS OVER A COMMUNICATION NETWORK FROM A PLURALITY OF DIFFERENT PROVIDERS; Inventors Lou Chavin, Howard E. Bussey, Philip Gerskovich, Mark S. Cook, Christopher M. Dobbs and Dale F. McIntyre which is the 111A application of Provisional Application Ser. No. 60/314,135 filed Aug. 22, 2001, titled SYSTEM, METHOD AND SOFTWARE PRODUCT FOR ALLOWING A CONSUMER TO ORDER IMAGE PRODUCTS OVER A COMMUNICATION NETWORK FROM A PLURALITY OF DIFFERENT PROVIDERS; Inventors Lou Chavin, Howard E. Bussey, Christopher M. Dobbs and Dale F. McIntyre.

FIELD OF THE INVENTION

The present invention relates to a system for ordering of digital images and/or image products over a communication network. In particular, the invention allows individuals and/or businesses to order goods and/or services over a communication network from a plurality of different providers, that offer the same and/or different goods and/or services, and that have various types of business relationships.

BACKGROUND OF THE INVENTION

The consumer digital photography industry has the potential for substantial growth. Yet, today several factors are standing in the way, slowing the growth rate. These factors can be understood from the perspectives of both consumer issues and business issues.

Today, many consumers are ignorant of the benefits of digital photography. Many who know of it's existence still see it as something "high tech," complex, and with limited usefulness—good for emailing, but not capable of producing "normal pictures." In particular, there is low awareness that traditional prints—the kind they expect from film—can be made from digital pictures.

Those who do understand its potential benefits are frustrated. Their experience with the digital photographic system is fraught with difficulties. In particular, it is not obvious how to get prints in a simple manner. Printing service infrastructures are not widespread. Awareness of Internet printing services is low. Solutions that do exist are closed, limited to a single provider, and therefore often limited in terms of access, location, and features. The only alternative is the "do it yourself" route—investing in the necessary printer and supplies, and printing at home. However, the consumer soon learns that this path has drawbacks. Supplies are expensive, the process takes time, trial and error is often necessary, technical problems can arise, and the quality and durability of the prints can be limited. Moreover, this route is only open to the technically confident—and only those who own a sufficiently capable computer and are willing to invest the time and effort needed.

Many service providers in the industry are aware of these problems. However, each service provider has to go it alone, trying to solve the problems single-handedly. A direct result is that each solution is incompatible with the next, as each provider tries to develop a competitive advantage. Solutions are often proprietary, and incapable of interacting with one another. Establishing new business relationships, such as partnerships between various retailers and service providers, are made more difficult as a result. Furthermore, participants are required to invest in parts of the service supply chain that are not within their core competencies. Potential new and innovative service providers in specific aspects of the service provider chain are locked out, since they do not have the resources to offer a complete end-to-end solution.

Perhaps worst of all, the consumers are not well served, since the choices from any one provider are limited. For example, if a consumer establishes an account with one particular Internet photo service provider, and stores their digital images using that provider, they are typically "locked into" using only that particular provider to provide photo services for those digital images. If a customer wants a particular photo service that the provider does not offer, such as printing their digital images as album pages, the customer must establish a new account with a second provider offering album pages, and also store their images with the second provider. This takes considerable time and effort on the part of the consumer, and may be difficult or impossible if the first provider scanned the customer's film in order to provide the stored digital images. Therefore, the customer cannot easily order desired services, and the first provider loses a business opportunity.

The present invention encourages photo service providers to establish various types of business relationships with business entities (such as retail store owners and device or software suppliers) who control various types of order terminals, (such as photo kiosks, portable digital imaging devices, or home PCs running application software). These business relationships are provided in a directory. The directory enables the order terminals controlled by different business entities (e.g. different retailers) to access a number of different photo service providers which have established a cooperative business relationship with the business entity, while blocking access to photo service providers that have a hostile business relationship. As a result, a customer has more choices of service providers, and can choose from a wide range of photo products offered by numerous service providers.

The present invention provides a system, method and software solution that links order terminals, such as retail photo kiosks, home PCs, and portable imaging devices together with service providers, such as Internet storage and printing providers, and retail photo finishing providers. It provides a mechanism to define business relationships between the business entities providing the order terminal, and the service providers to ensure that only appropriate providers can be accessed from a particular order terminal. It supports the ability for billing and payment information to flow around the system that gives economic incentives for participants to work together.

SUMMARY OF THE INVENTION

In accordance with one aspect of the present invention, there is provided a method of method for ordering of digital photo services over a communication network among a plurality of photo service providers from a plurality of order terminals, each of the order terminals being associated with a one of a plurality of business entities, comprising:

maintaining information with respect to business relationships between the photo service providers and the plurality of business entities;

providing an offering at one or more of the plurality of order terminals based on the business relationships associated with the one or more of the order terminals.

In accordance with another aspect of the present invention, there is provided a system for a system for facilitating ordering of digital photo services over a communication network by a user among a plurality of photo service providers from a plurality of order terminals, each of the order terminals being associated with a one of a plurality of business entities, comprising:

a control system for maintaining information with respect to business relationships between the photo service providers and the plurality of business entities, the control system having a communication device for communicating with the plurality of order terminals over the communication network, the order terminal being used by the user displaying an offering based on the business relationships associated with the order terminal.

In accordance of a further aspect of the present invention, there is provided a computer software program having instructions such when loaded on to a computer the program will implementing a method for ordering of digital photo services over a communication network among a plurality of photo service providers from a plurality of order terminals, each of the order terminals being associated with a one of a plurality of business entities, the method comprising:

maintaining information with respect to business relationships between the photo service providers and the plurality of business entities;

providing an offering at one or more of the plurality of order terminals based on the business relationships associated with the one or more of the order terminals.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the detailed description of the preferred embodiments of the invention presented below, reference is made to the accompanying drawings in which:

FIG. 5 is a diagram of a directory of service providers and order terminals, which includes information defining business relationships.

FIG. 6A-D is a diagram of depicting a display of offerings on four order terminals controller by four different business entities.

DETAIL DESCRIPTION OF THE INVENTION

Figure 1:
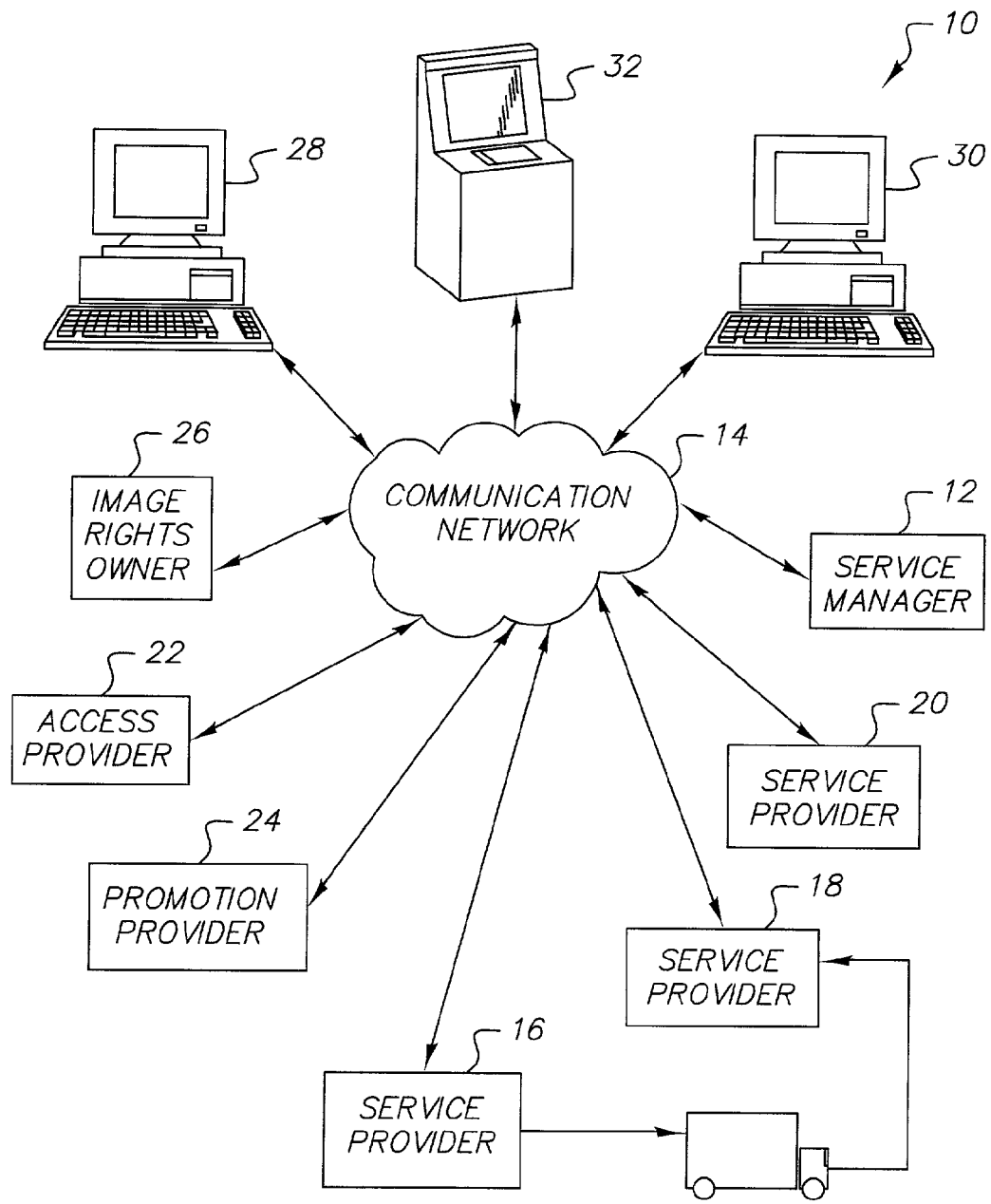
FIG. 1 is diagram of a generalized system made in accordance with the present invention.

Referring to FIG. 1, there is illustrated a system 10 made in accordance with the present invention. The system 10 is designed to provide extensive offerings of image products and services from a plurality of different photographic service providers. The system 10 allows an individual service provider to concentrate on providing the goods and/or services for which they have core competencies. The system 10 also allows a member service provider to offer their customers the goods and/or services of other member providers with which they have established a cooperative business relationship, while blocking access to member providers which have a hostile relationship with that individual service provider. The system 10 uses standards and protocols that are followed by the members for the transmission of images and orders over the communication network so that the various members can easily exchange or provide information to other members and/or users. In addition, the system 10 permits the providers to offer services to a potential broader range of customers. The system 10 further allows the customer to create inquires so that orders can be fulfilled by a service provider that meets the criteria provided by the customer.

The system 10 includes a service manager 12 that provides several functions. In the embodiment illustrated, service manager 12 comprises is a computer/server having appropriate software programs for operation in accordance with the present invention. The service manager 12 provides a services directory of various services/goods that may be obtained from member providers through the system 10. Each member provider (photo service provider) registers with the service manager 12 setting forth the type of goods and services it can provide. Additional information may be provided by the member provider, such as location, hours of operation, costs, delivery options or any other information the service provider believes may be useful by a potential purchaser. This may also include specific information that is viewed by potential purchasers. For example, one price list may be reserved for a wholesale business and one for a retail customer. Or different price lists may be used depending on the business relationships, as will be described later.

The information concerning services/goods is stored by the service manager 12 in a manner that allows members and customers to search the information to find a provider that best matches their needs and requirements for goods and/or services.

The service manager 12 is accessible by various member providers 16, 18, 20, 22, 24, 26, and customers/users 28, 30 and 32 over a common communication network 14. In the embodiment illustrated, the communication network 14 comprises the Internet. However, any appropriate communication network may be utilized such as a local area network (LAN) or a wide area network (WAN). In order for member providers 16, 18, 20, 22, 24 and 26 to be accessed through the system 10, they must have registered with the service manager 12 providing the appropriate required information and optional information that is allowed. The registration process includes an agreement by the provider to follow the technical standards and business practices set forth by the system 10. In the embodiment illustrated, member providers 16, 18, and 20 are service providers that provide various photographic related goods and/or services. The member providers 16, 18, and 20 may provide a full range of photographic goods and/or services, provide only a few services, or provide specialty goods and/or services. For illustrative purposes only, member provider 16 may provide a full range of photographic prints and/or services, whereas member provider 18 may provide only large prints and framing and member provider 20 may provide novelty products such as mugs, T-shirts, hats, etc having custom images thereon.

Member provider 22 in the embodiment illustrated is an access provider that stores high resolution digital images that can be accessed by other member providers and/or users. The member provider 22 may charge these members and/or users for storage and/or access to the digital images in any manner deemed appropriate. For example, but not by way of limitation, charges may be assessed to the owner of the digital image and/or to the entity accessing the image.

Member provider 24 in the embodiment illustrated is a promotion provider that makes available to customers or other members promotions with respect to the purchase of goods and/or services. For example, the member provider 24 provides a promotion to member provider 16 for a customer that purchases goods and/or services through or from member provider 16. A fee may be paid by member 24 to access member provider 16 or to the service manager 12. Also a fee usually incurred by the customer can be subsidized or paid by the member provider 24.

Member provider 26 is an image owner that has ownership rights to images that it stores or that is stored on his behalf at member provider 22. Member provider 26 may collect fees from a user or another member provider in exchange for granting the right to use digital images that it owns.

Customers/users 28, 30, and 32 represents various users connected to system 10 for the placing of orders for goods and/or services with respect to digital images. The customers/users may use different types of order terminals to place their order. In particular, users 28 and 30 represent two separate customers using personal computers that have appropriate software for communication over the internet 14 and interacting with the various member providers and service manager 12. In this case, the personal computers serve as order terminals. Customer/user 32 is a computer terminal typically located at retail or public available site. In the embodiment illustrated, customer 32 is using a kiosk for communication with system 10. The images may be provided by the customer directly to the kiosk or may be accessed from a digital storage location that is near or remote from the customer. For example, the digital images may be stored by access provider 22.

In the event that member provider 16 requires an additional service from another member provider such as member provider 18, it may be necessary to transfer a partially completed order between member providers. It is preferable that the additional service be provided over the communication network 14. However, in some cases this may not be an option. For example, but not by way of limitation, member provider 16 may produce an enlargement of a customer supplied digital image. To complete the order, member provider 16 requests the framing service offered by member provider 18. To complete the order, the enlargement with associated order information must be physically transported to member provider 18 via delivery transport 34 such as a vehicle. Once the requested frame is combined with the enlargement, the completed order can then be shipped back to provider 16 for delivery to the recipient or shipped directly from member provider 18 using the information regarding order delivery collected by member provider 16 to the recipient.

Figure 2:
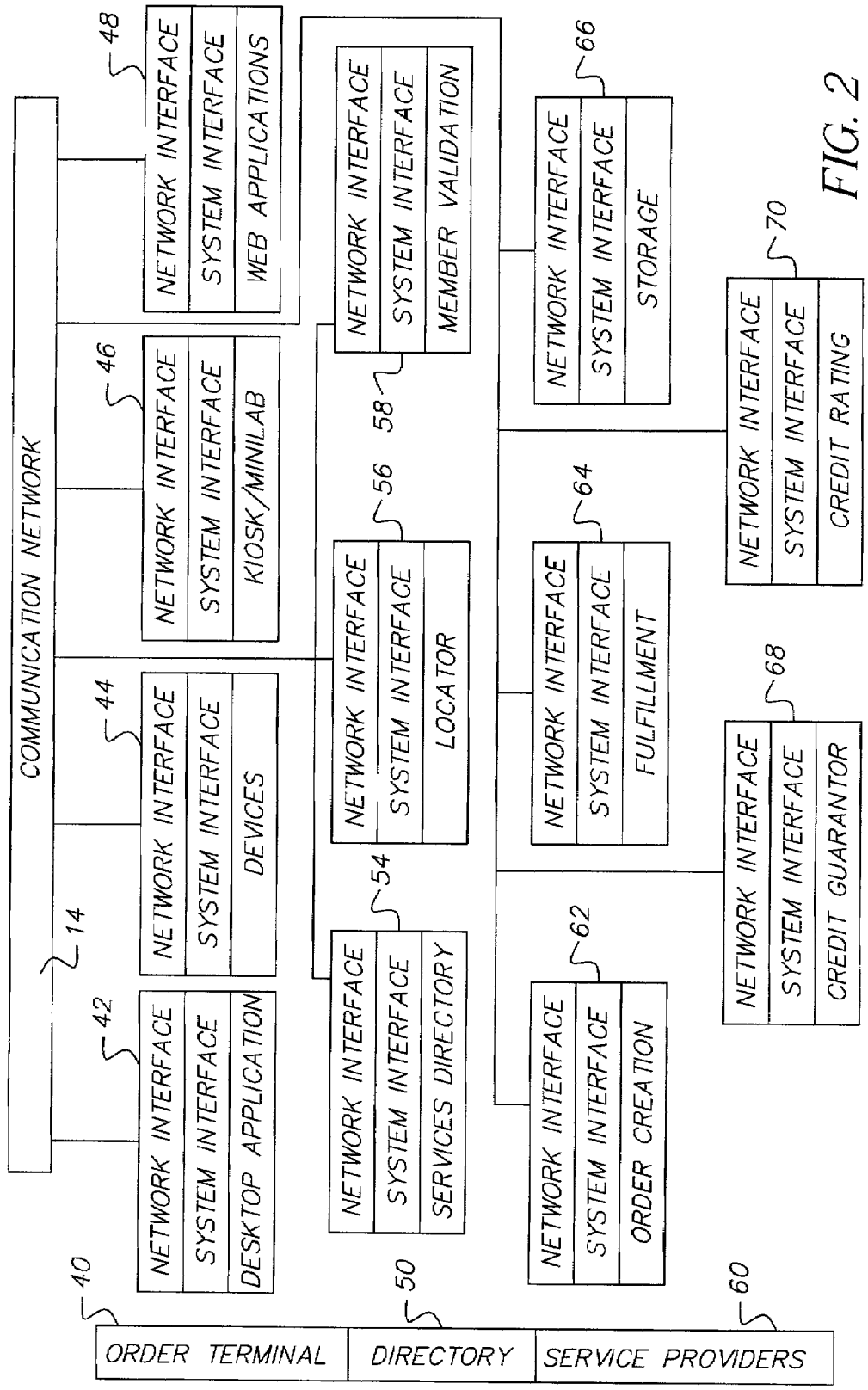
FIG. 2 is diagram of component architecture of the system of FIG. 1.

Referring to FIG. 2, there is illustrated a diagram of the component architecture of the system of FIG. 1. The system 10 can be considered as being divided into types of components. The components include order terminals 40, which consist of software and devices for the creating and placing of orders. For example, a customer may place an order using a computer, such a personal computer, running a desktop software application 42, which establishes a connection with system 10. Device 44 comprises various other electronic devices capable of communicating with system 10 such as, but not limited to digital cameras, digital image enabled phones, digital picture frames, and personal digital assistants. These are typically portable digital imaging devices which enable digital images to be viewed, and enable a user to interact with the device to place an order for photo services using one or more digital images. Device 46 represents a kiosk having an appropriate user interface and a communication interface for communicating with system 10 thereby allowing a user of the kiosk to create and place an order for goods and/or services. Alternatively, device 46 may comprise a digital mini-lab having appropriate communication software thereby allowing a retailer and/or customer to create and place an order for goods and/or services within system 10. In an alternate form of use of a personal computer, a customer at block 48 may run a software application via a conventional web browser such as Netscape Navigator for gaining entry to system 10.

Continuing with FIG. 2, a middle layer 50 represents the functionality of the service manager 12. Middle layer 50 is partitioned into functional blocks 54, 56, and 58. As illustrated, each of blocks 54, 56, and 58 can reside on different web servers (not shown) each with their own interface to the communication network 14 and system 10. Such partitioning allows the system 10 and service manager 12 to scale more readily as network traffic increases. However, functional blocks 54, 56, and 58 can alternatively reside on a single web server/computer (not shown) when serving locations with lower network demand. Block 54 comprises a directory/list of all available services within system 10 and includes the database functionality of all the registered member providers and their related information such as unique member ID, service capability, costs of goods/services, delivery capability etc., etc. It is to be understood that a member provider can represent a group/chain of commonly branded and/or owned stores, for example, a chain of drug stores, discount stores, etc. In this case the unique member ID may further include an additional code/number to designate specific store site within the chain. The registration information provided by the provider includes required information of the member provider and any optional information that is allowed by manager 12. Block 54 can be queried from the communication network 14 and communicates with Blocks 56 and 58 to assist users and/or member providers to select the proper combination of member providers to complete an order as will be described later herein. The registration information provided by the service provider can include information describing one or more business relationships that the service provider has established with particular business entities. Such relationships may can be friendly or hostile relationships.

Block 56 represents a unique service available within system 10 and is known as a locator service or simply a locator. The locator functions to provide and receive criteria from users and/or member providers. The criteria is then formed into filters that can be applied to the services directory database of block 54. Block 54 returns a list of member providers to the locator of block 56 matching the provided criteria. An example of a criterion provided by the locator is the physical proximity of the member provider to the service requester. It should be understood that the criteria may comprise a list of various desired criterion. In addition, the service manager 12 may set predetermined sets of various criteria/criterion that can simply selection of a particular provider. This allows the system 10 to offer well know feature that are market to broad consumer base, for example, a branded feature, such as Kodak's Color Watch™ system for producing prints.

Block 58 provides member validation services to requesting member providers to prevent fraud by validating that a member provider is a legitimate registered member or customer in good standing. This information can also be used to regulate pricing to specific classes of service requestors in order to differentiate between wholesale, retail and user level service requests, and to differentiate based on the business relationship between the business entity.

Continuing with FIG. 2, a bottom layer 60 is shown which represents all the various services and member providers provided by the system 10. Bottom layer 60 includes a plurality of services 62, 64, 66, 68, and 70. In the particular embodiment illustrated, service 62 provides for the ability of creating an order on behalf of a requester. The order creation services may be provided by any of the member providers 16, 18, 20, 22, 24, and 26. For example, the order creation may result from the user accessing member provider 22 who then processes the order by having the appropriate member provider providing the requested goods and/or services. Alternatively, the order creation may occur directly with any of the other member providers as appropriate for that member provider.

Service block 64 represents the fulfillment of goods and/or services for a requester. The actual fulfillment of goods and/or services will be provided by any of the registered member providers capable of providing the required goods and/or services.

Service block 66 represents where the digital images are stored. In the particular embodiment illustrated, this is provided by member provider 22. However, it will be understood that any of the member providers of system 10 can store and provide access to digital images.

Service block 68 represents a system whereby a provider provides goods and/or services to a customer to which it is not directly affiliated with. The system 10 provides for an optional guarantee of payment for services provided by member providers that guarantees payment to a requested member provider who produces the requested goods and/or services from the requesting member provider. The accountability of credit guarantors stabilizes a large system such as system 10 where different member providers can be located globally and have no formal business relationship with each other. Defaulting on the payment for delivered goods and/or services by a requesting member provider causes service manager 12 to negatively impact the credit rating of the defaulting member provider, and may include removing the member from the Directory list. In addition, the manager 12 can assess a fee against a member provider to be credited against the cost of goods and/or services delivered. Periodic renewals of member provider registrations can have a higher fee associated with member providers with a history of defaulting or late payments.

Service block 70 represents a credit and quality of service performance history available to requesting and/or authorized member providers or customers. This rating may be of value in determining the choice of a member provider and used as a criterion by the locator of block 56. The service request can have an associated fee with the retrieval of the requested information.

Figure 3:
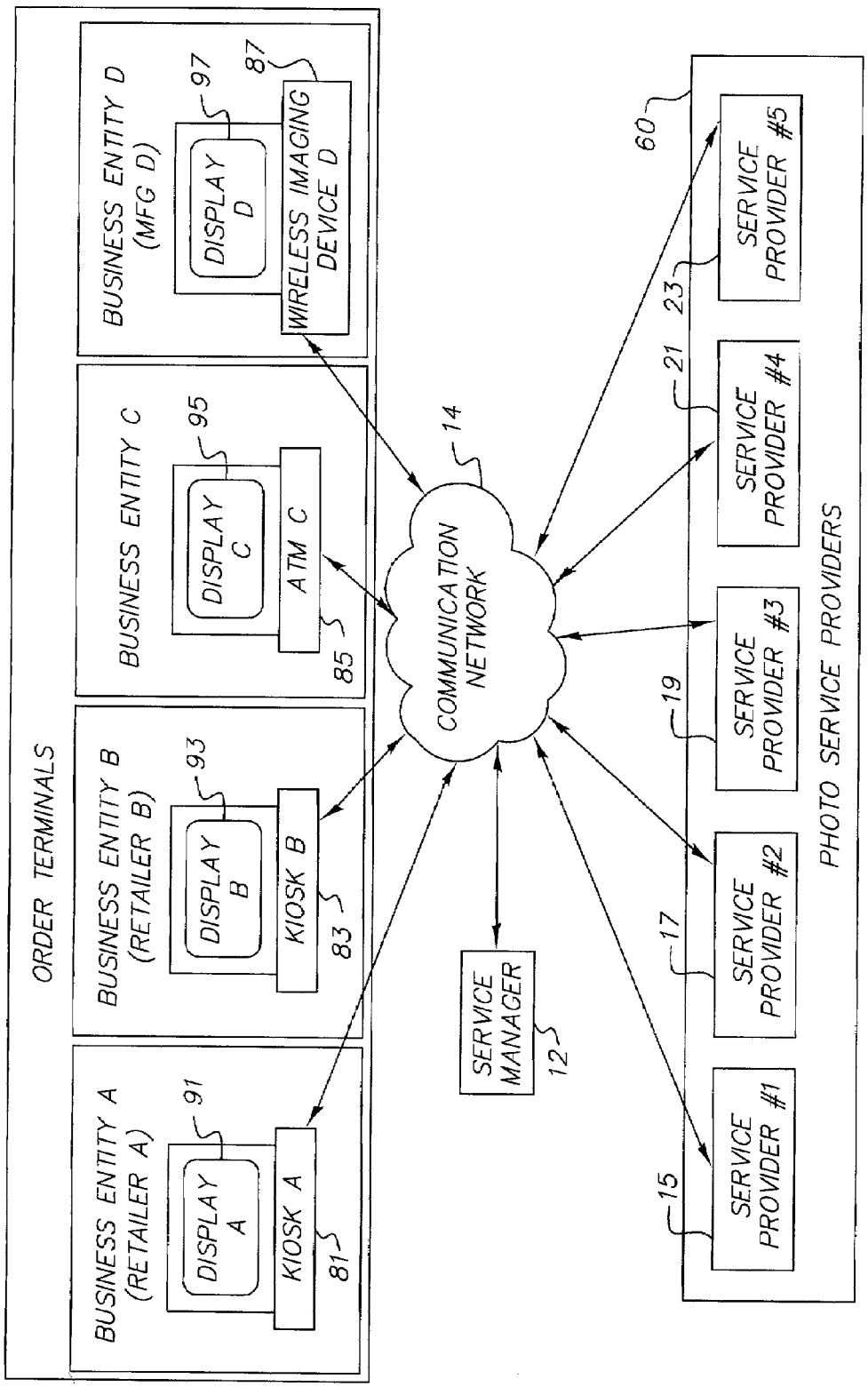
FIG. 3 is a block diagram of a first embodiment of a system made in accordance with the present invention.

FIG. 3 is a block diagram of a first embodiment of a system made in accordance with the present invention. In this embodiment, a plurality of order terminals 40 are connected to the communications network 14. Each order terminal 40 is associated with a particular business entity. A plurality of service providers 60 are also connected to the communications network 14. The service providers 60 include a first (#1) service provider 15, a second (#2) service provider 17, and third (#3) service provider 19, a fourth (#4) service provider 21, and a fifth (#5) service provider 23. The service manager 12 includes a directory that provides information describing the business relationships between the business entities associated with each order terminal 40 and the service providers 60.

Order terminal 81 is a photo kiosk associated with business entity A (retailer A). It can be located inside a store owned by retailer A. For example, retailer A may own a large chain of drugstores, and order terminal 81 may be owned or leased by retailer A and located in one of these drugstores. Order terminal 81 includes a display screen 91 that is used to display an offering of goods or services to a user. Order terminal 83 is a second photo kiosk associated with a different business entity B (retailer B). For example, retailer B may own a different, competing chain of drugstores. In this case, photo kiosk 83 can be located inside one of the drugstores owned by retailer B. Order terminal 83 includes a display screen 93, which is also used to display an offering of goods or services to a user. In many cases, retailer A and retailer B have a hostile (e.g. competitive) relationship. For example, Retailer A would typically does not want customers to come into their store and use their photo kiosk 81 to access services provided by retailer B. Therefore, the offerings displayed on the display screens 91 and 93 need to be customized in view of the business relationships between the business entities associated with the order terminals 40 and the service providers 60.

Many different types of order terminals 40 are possible. For example, order terminal 85 is an ATM (automatic teller machine) that can be located in a public area. In addition to providing banking services, order terminal 85 can also enable a user to order photo services. Order terminal 85 includes a display screen 95, which is used to display an offering of goods or services to a user. The business entity C can be a bank, or an independent business which owns or rents ATM type kiosks. Order terminal 87 is an example of a portable wireless imaging device which can be used to place an order for goods or services. The device can be a cell phone, personal digital assistance (PDA), digital camera, or other type of wireless device. The business entity D associated with the order terminal 87 can be the company that manufactured the device, the company that marketed the device, the retailer that sold the device, or a company that is renting the device to the user. It is understood that many other types of order terminals are possible, including imaging devices, such as digital cameras and home computers that are wired to the communications network, home television set-top boxes or video game boxes connected to the internet, and other internet connected appliances.

Figure 4:
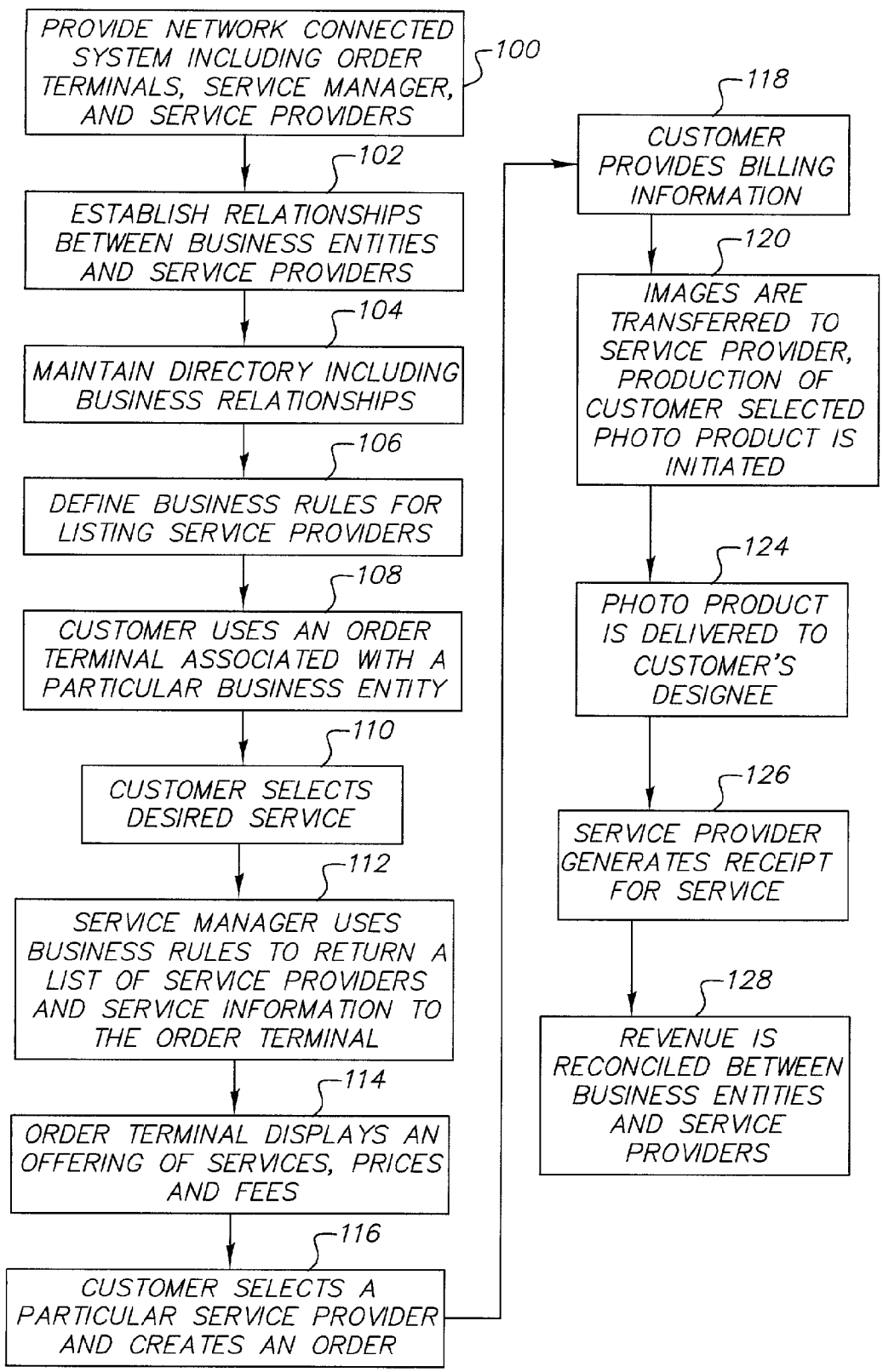
FIG. 4 is a flow diagram of a first embodiment of a method made in accordance with the present invention, using the system of FIG. 3.

FIG. 4 is a flow diagram of a first embodiment of a method made in accordance with the present invention, using the system of FIG. 3. In block 100, the business entities associated with the order terminals 40, the service providers 60, and the parties controlling the service manager 12 agree on the protocols to be followed by the system, as was described earlier in relation to FIGS. 1-2, and introduce network connected equipment and services conforming to these protocols.

In block 102, business relationships are established between the service providers and the business entities associated with the order terminals 40. For example, but not by way of limitation, the business relationships can include a "domestic" relationship, where the same business entity that is associated with the order terminal is also associated with the service provider. For example, a retailer may both own or lease many photo kiosk order terminals, and own or control an on-line photo service provider. In this case, the retailer typically prefers to preferentially feature the service provider they are associated with, when listing services on their order terminals.

The business relationships can also include a hostile (e.g. competitive) relationship. For example, a company (for example retailer A) that owns or controls an on-line photo service provider can also own a chain of stores that are major competitors to the business entity (for example retailer B) that owns or leases many photo kiosk order terminals. In this case, the retailer B might prefer that their order terminals preclude users from accessing services provided by retailer.

The business relationships can also include a "friendly" relationship. For example, a service provider could have established a "strategic relationship" with a particular retailer that is associated with particular order terminals. Finally, the business relationships can also include a "neutral" relationship. A service provider may choose to offer different prices for the same services, depending on whether the order is placed from an order terminal associated with a domestic, a friendly, or a neutral business relationship.

In block 104, the service manager 12 populates and maintains a directory that provides the business relationships between a plurality of business entities associated with the order terminals 40, and the service providers 60. An example of such a directory is shown in FIG. 5. It will be understood that in alternative embodiments, the directory can be maintained in a various ways, for example by using a distributed directory. For example, in some alternative embodiments, the directory information describing specific business relationships can be stored in each order terminal 60. However, this is not preferred because of the difficulty of updating the directory in each order terminal as service providers change their offerings, and as new service providers are added to the system. It will further be understood that the information maintained by system 10 with respect to the business relationships between the business entities and the service providers can be stored in ways that do not utilize a specific directory structure.

FIG. 5 depicts a directory having rows of entries for a plurality of service providers 60. Each row provides the business relationship between a particular provider and the business entities associated with the plurality of order terminals 40. Each row of entries includes a provider number (e.g. #1), a provider name (e.g. retailerA.com), the service provided (e.g. printing), and the business relationship between that particular service provider and the business entities which control the order terminals 40. The business relationships include domestic (D), friendly (F), neutral (N) and hostile (X). The directory includes one row of entries for each of the service providers (#1-#5) 15, 17, 19, 21, and 23, and one column of entries for each of the business entities (A-D) associated with the order terminals 40 in FIG. 3.

It will be understood that the directory normally includes many more entries for different service providers and business entities, and many other types of services. These services can include image storage, printing of many different types of photo products, providing digital storage media, such as CD-R discs, containing digital images; and providing associated goods (such as photo albums) and/or services (such as red-eye reduction algorithms and other picture improvement processing) with respect to digital images or hardcopy prints.

It will be further understood that the directory includes, or references, many other types of information. In a preferred embodiment, this information includes a description of the services provided and at least one icon for the service provider, such as a graphic icon of the trade name of the service provider. This information also includes the address and financial account number of the provider and price lists which are based on the business relationship. The information can also include information describing the brand names of materials used to provide the services (e.g. uses Kodak chemical and paper). The information can also describe the delivery methods offered by the service provider, such as in store pick-up, normal mail delivery, express mail delivery, etc. The information can also include the geographic area served by the provider (e.g. what countries the provider can serve). It will be understood that the directory can be formatted and stored in various ways. Instead of the four types of relationships shown in FIG. 5, a different number of relationships can be used.

In block 106, business rules are defined for listing service providers 60 on the order terminals 40. These business rules may be provided by the service manager 12, as part of the services directory 54, or as part of the locator 56. Alternatively, these business rules may be provided by the business entity controlling the order terminal 60, and stored as part of the control software for the order terminal. The business rules define how to use the business relationships, provided for example using the directory information in FIG. 5, when making an offering to the user of an order terminal. For example, the business rules can indicate that only service providers having domestic and friendly relationships should be displayed, or alternatively that service providers having neutral relationships should also be displayed. The business rules can also define how many different service providers should be listed, and whether the order in which they are listed should be based on physical location, price, and/or other criteria.

In block 108, a customer uses an order terminal associated with a particular business entity. In block 110, the customer uses the order terminal 40 to select a desired service. For example, the customer can bring a digital image storage device, such as a PictureCD (or alternatively another type of optical disc or magnetic disc) containing digitized film images, to photo kiosk 81 and insert it into a CD reader slot (not shown). The display 91 on the photo kiosk can display thumbnails of the images stored on the PictureCD. The user may desire to make reprints of some or all of the images stored on the PictureCD. In a second example, a user can user a photo kiosk 83 to access images previously stored by a photo service provider. The user may desire to make a photo T-shirt using one of these images as a gift. In a third example, a user may be on vacation, and use the ATM order terminal 85 located in a hotel or theme park. The user may desire to upload images stored by their digital camera on a memory card. The ATM order terminal 85 can include a memory card slot (not shown) for receiving the memory card. In a fourth example, a user can use a wireless imaging device D 87, such as a mobile phone having an image display 97, to view images previously uploaded and stored by a service provider. The user can then order additional prints of selected images to be made by the same provider, or by a different provider.

In block 112, the service manager 12 uses the business rules to return a list of service providers and service information to the order terminal. This service information can include a description of the services provided, one or more icons for the service provider, and price information, as described earlier in relation to block 104. In some embodiments, the list of service providers is provided by the service manager 12 to the order terminal 40 only after a user has selected a particular service, such as storage or printing. In other embodiments, the list of service providers can be provided by the service provider 12 to the order terminal 40 on a daily or weekly basis, for example, and stored for future use.

In block 114, the order terminal 40 displays an offering of services, which can include the prices/fees for the services. The number and order of the service providers displayed on the order terminal 40 depends on the business relationship between the service providers and the business entity associated with the order terminal.

FIG. 6A, FIG. 6B, FIG. 6C, and FIG. 6D depict four different displays of offerings on four different order terminals (e.g. order terminals 81, 83, 85, 87 in FIG. 3) associated with four different business entities. The information displayed on the order terminal display screen (e.g. displays screen 91, 93, 95, and 97 in FIG. 3) is based on the business relationship between the business entity associated with the particular order terminal and the service provider.

Figure 6A:
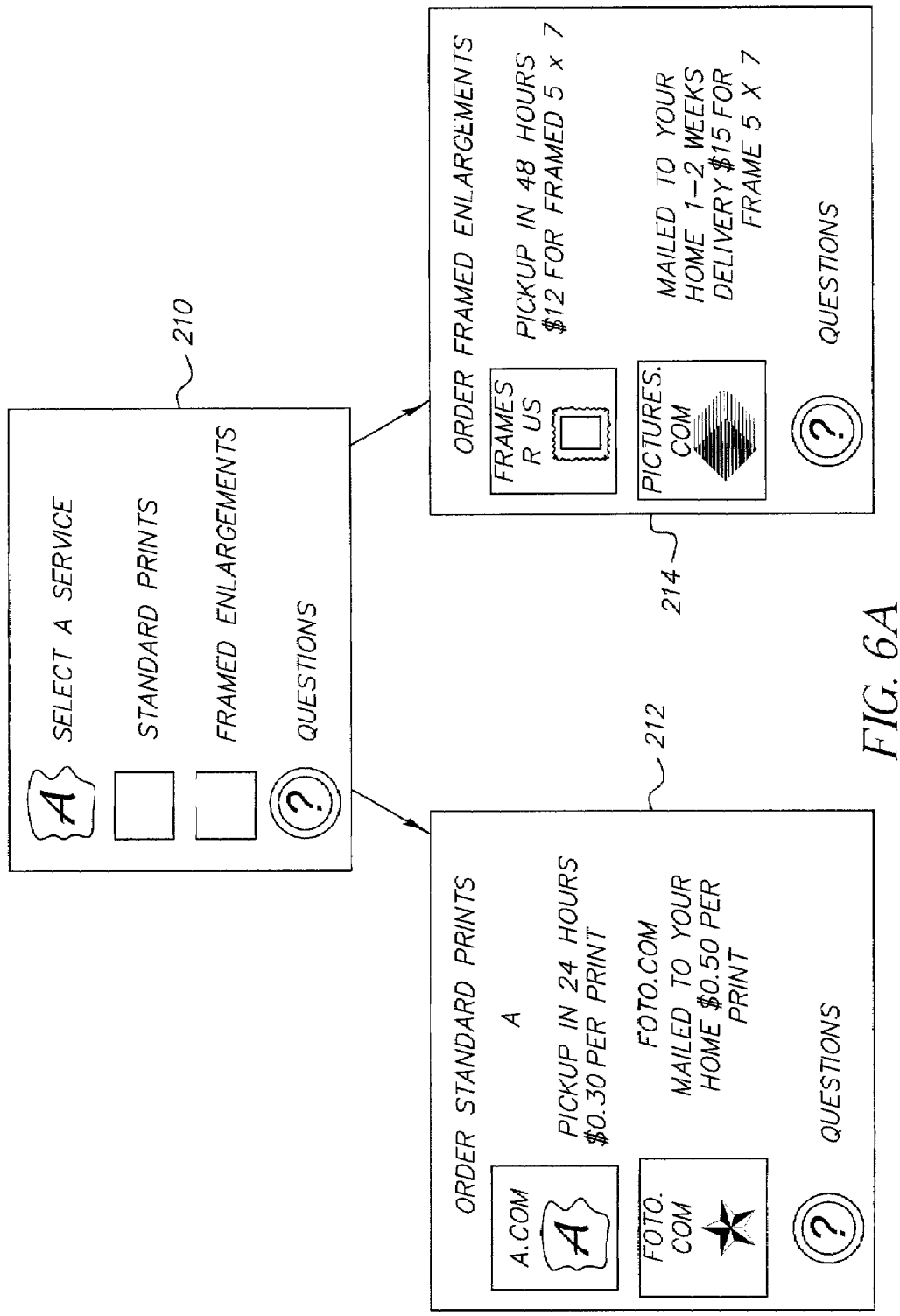

FIG. 6A shows an example display offering for photo kiosk order terminal 81 in FIG. 3, for the business relationships shown in FIG. 5. A first screen 210 includes an icon for the business entity (retailer A) that controls photo kiosk order terminal 81. Screen 210 enables a user to select a service, such as standard prints or framed enlargements, or to select an icon to answer questions concerning the system. If the user selects standard prints, screen 212 is displayed on the display 91 of order terminal 81. Screen 212 includes icons and information for two printing service providers, provider #1 (retailerA.com) which has a domestic relationship with business entity A, and provider #3 (FOTO.com) which has a neutral relationship with business entity A, as shown in FIG. 5. Screen 212 does not include an icon or information for provider #2 (retailerB.com) which has a hostile relationship with business entity A. The icon and information for provider #1 (retailerA.com) is shown first, since there is a closer relationship with this provider than with provider #3. The prices displayed also correspond to the business relationships. In other words, the prices for provider #1 (retailerA.com) are lower when displayed on order terminal 81, controlled by business entity A, since these companies have a domestic relationship. The prices for provider #1 could be higher when using an order terminal controlled by a business entity having a friendly or a neutral relationship.

If a user instead selects framed enlargements, screen 214 is displayed on the display 91 of order terminal 81. Since provider #4 (FramesRus) has a friendly relationship with business entity A, while provider #5 (Pictures.com) has a neutral relationship, the services offered by provider #4 are listed first. The friendly business relationship can include providing goods directly from the provider #4 to retailer A, as indicated by the "pickup in 48 hours" statement in screen 214. Furthermore, the price differences between providers #4 and #5 may reflect the different business relationships. Of course, the user may nevertheless choose service provider #5 for some reason, for example because they offer a type of frame not offered by provider #4, or because the user has been happier with the quality of their products in the past.

Figure 6B:
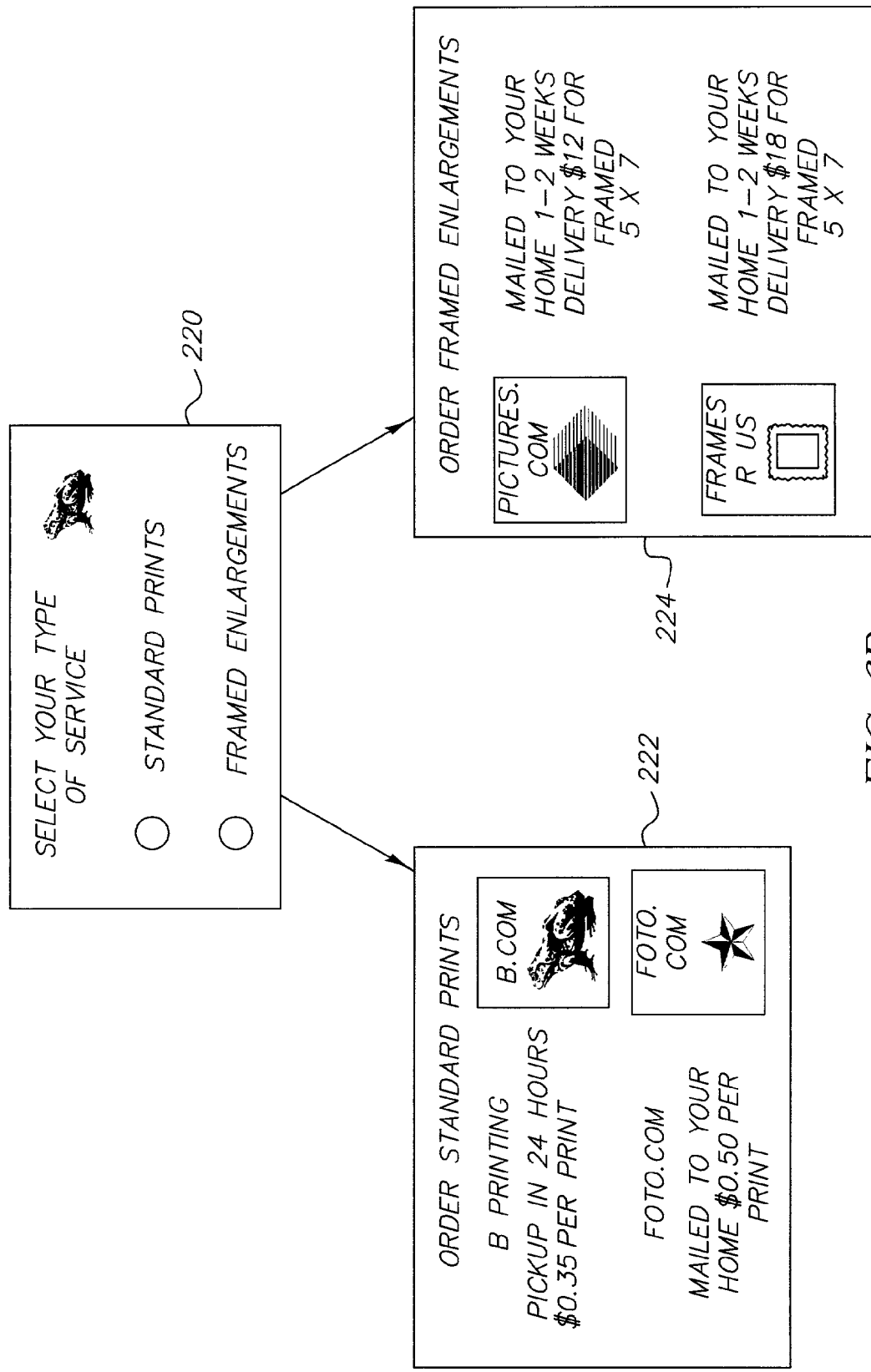

FIG. 6B shows an example display offering for photo kiosk order terminal 83 in FIG. 3, for the business relationships shown in FIG. 5. A first screen 220 includes an icon for the business entity (retailer B's bullfrog) that controls photo kiosk order terminal 83. Screen 220 enables a user to select a service, such as standard prints or framed enlargements. If the user selects standard prints, screen 222 is displayed on the display 93 of order terminal 83. Screen 222 includes icons and information for two printing service providers, provider #2 (retailerB.com) which has a domestic relationship with business entity B, and provider #3 (FOTO.com) which has a neutral relationship with business entity B, as shown in FIG. 5. Screen 222 does not include an icon or information for provider #1 (retailerA.com) which has a hostile relationship with business entity B. Again, the icon and information for provider #2 (retailerB.com) is shown first, since there is a closer relationship with this provider than with provider #3. The prices displayed also correspond to the business relationships.

If a user instead selects framed enlargements, screen 224 is displayed on the display 93 of order terminal 83. Since provider #5 (Pictures.com) has a friendly relationship with business entity B, while provider #5 (FramesRus) has a neutral relationship, the services offered by provider #5 are listed first. In this example, the friendly business relationship between business entity B and provider #5 means that the prices for framed prints from "Pictures.com" is less expensive when ordered from order terminal 83 than when ordered from order terminal 81, using screen 214 in FIG. 6A.

Figure 6C:
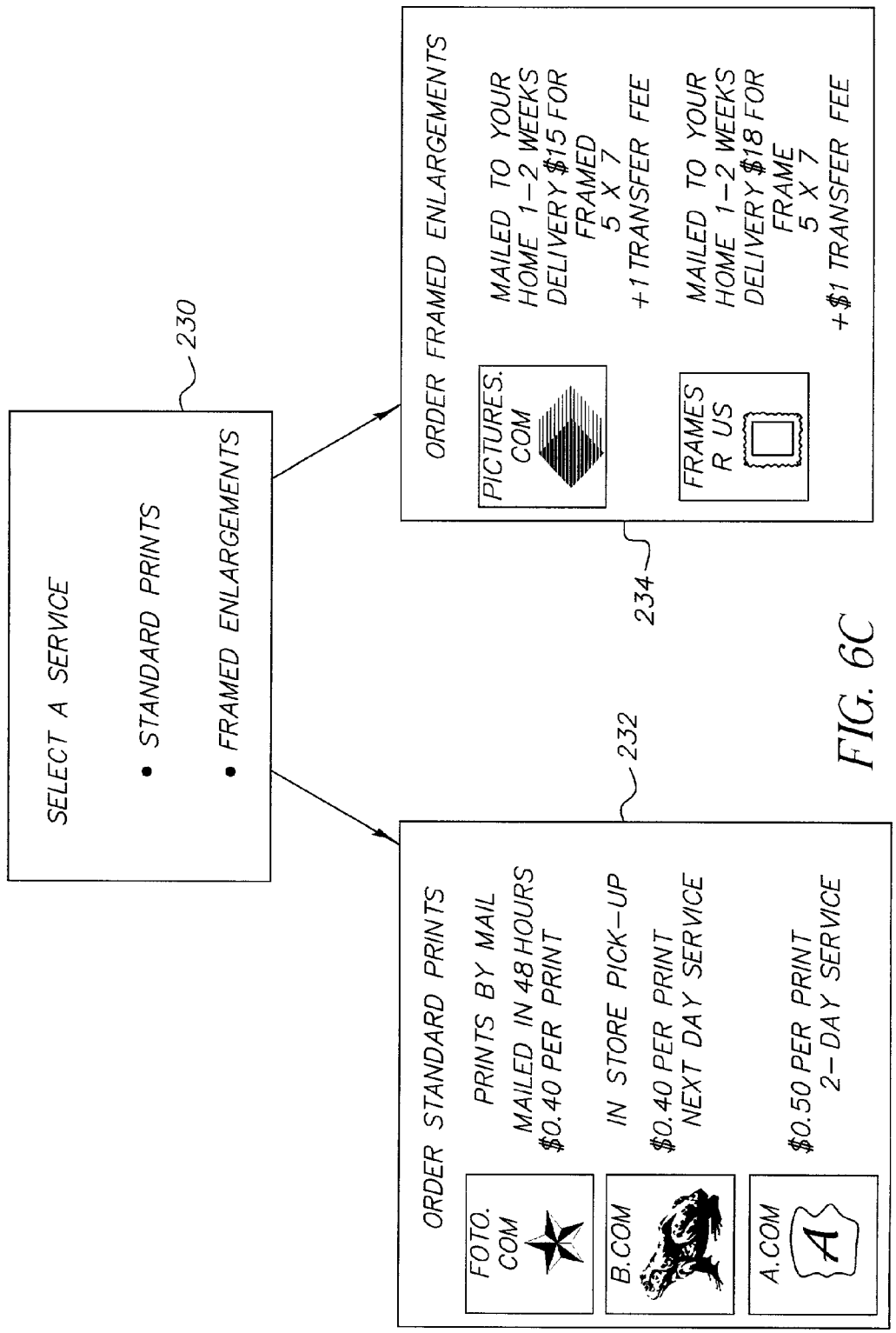

FIG. 6C shows an example display offering for ATM order terminal 85 in FIG. 3, for the business relationships shown in FIG. 5. A first screen 230 enables a user to select a service, such as standard prints or framed enlargements. If the user selects standard prints, screen 232 is displayed on the display 95 of order terminal 85. Screen 232 includes icons and information for a preferred service provider, provider #3 (FOTO.com), which has a friendly relationship with business entity C, which is associated with order terminal 85. Screen 232 also provides icons and information for two printing service providers, provider #2 (retailerB.com) and provider #1 (retailerA.com) which have neutral relationships with business entity C. These two providers are listed in order of the lowest price. The prices displayed are based on the business relationships, so that the prices for FOTO.com are less expensive in screen 232 than in screen 212 of FIG. 6A, for example.

If a user instead selects framed enlargements, screen 234 is displayed on the display 95 of order terminal 85. Both provider #4 (FramesRus) and provider #5 (Pictures.com) have a neutral relationship with business entity C. The order of service providers is again based on price.

FIG. 6D shows an example display offering for wireless imaging device 87 in FIG. 3, for the business relationships shown in FIG. 5. In this example, the order terminal 87 allows a user to order standard prints, but does not allow a user to order framed enlargements. When the user decides to order prints, screen 242 is displayed on the display 97 of order terminal 87. Screen 242 enables the user to select one of two different printing service providers, provider #3 (FOTO.com), which has a domestic relationship with business entity D, and provider #1 (retailerA.com), which has a neutral relationship with business entity D, as shown in FIG. 5. Screen 242 does enable the user to select provider #2 (retailerB.com), which has a hostile relationship with business entity A. The information for provider #3 is shown first, since there is a closer relationship with this provider than with provider #3. The prices displayed also correspond to the business relationships.

In block 116, the customer selects a particular service provider and creates an order. For a given user, there are many criterion which can affect their selection of a service provider either explicitly or implicitly, and can include any of the following criteria: brand, cost of service, specific product characteristics, delivery time, delivery method, delivery reach, access time, and/or the ability to ship to a specific location. Depending on the photo products and services selected by the user, and the services offered by the selected service provider, it will be understood that the user may be asked to select various images to be used (e.g. printed), the number of copies to make, the print size and finish, etc.

In block 118, the customer provides billing information. In some situations, this financial transaction with the user may be accomplished by using the same order terminal 40 to enter a credit card type, account number, and expiration date. This financial transaction with the user can be handled by the business entity associated with the order terminal 40, the service manager 12, or the service provider 60. In most situations, the entity which completes the transaction needs to share some of the revenue with one or more of the other parties. In other situations, this financial transaction with the user may be done separate from the order terminal 40. For example, the order terminal 40 can create a paper or electronic receipt, and the user can then pay for the products or services they ordered using a separate cash-register transaction.

In block 120, the images are transferred to the service provider, and the customer selected photo products or services are provided. As noted earlier, the digital images used to produce the photo products or services can be input to the order terminal using digital storage media, such as a PictureCD or digital memory card, or by scanning photographic media such as prints or film. Alternatively, the digital images may already be stored as part of system 10 by one of the service providers 40.

In block 124, the photo product is delivered to the customer's designee, which may of course be the customer, a different individual, or a location such as a retail store designated by the user. The delivery could be to the same retail store where the kiosk is located, to a store in remote city, or to a home address.

In block 126, the service provider generates a receipt for the service provided. In a preferred embodiment, this is an electronic receipt. The electronic receipt can be sent to the business entity associated with the order terminal 40 which provided the order, and/or to the service manager 12.

In block 128, the revenue received from many customers for providing the photo products or services is reconciled between the business entities and service providers involved in the process of selecting the service provider, storing and transferring digital images, and producing and delivering photo products. Depending on the products and services ordered by users, various service providers can have other service providers provide goods and/or services for the completion of an order. As a result of such business transactions, certain providers will owe (or will be owed) monies to other service providers and other business entities.

The system 10 allows for periodic settlements of monies owed by producing periodic reports that are forwarded to the providers owing monies to each other. This report may include the net resulting monies owed, thus minimizing the financial transactions between the providers. The periodic reports can be done on a daily, weekly, or monthly basis as desired by the parties. In order for the system 10 to properly function, the orders in the system 10 are passed through the service manager 12 that keeps track of the business transactions required to complete each order. Unique member IDs are used for securing the confidential nature of this information and properly assigning liabilities and/or credits to member providers.

In an alternate embodiment, each service provider initiates a settlement transaction report at the completion of their requested and provided service. In this case, member providers transmit the settlement transaction report directly between member providers and cause payments of monies to flow for each completed service request. The settlement transaction report is also provided to the service manager 12 for tracking of information related to quality of service and/or financial reliability that impact the credit rating or the standing of a specific member provider in the services directory 54.

Figure 7:
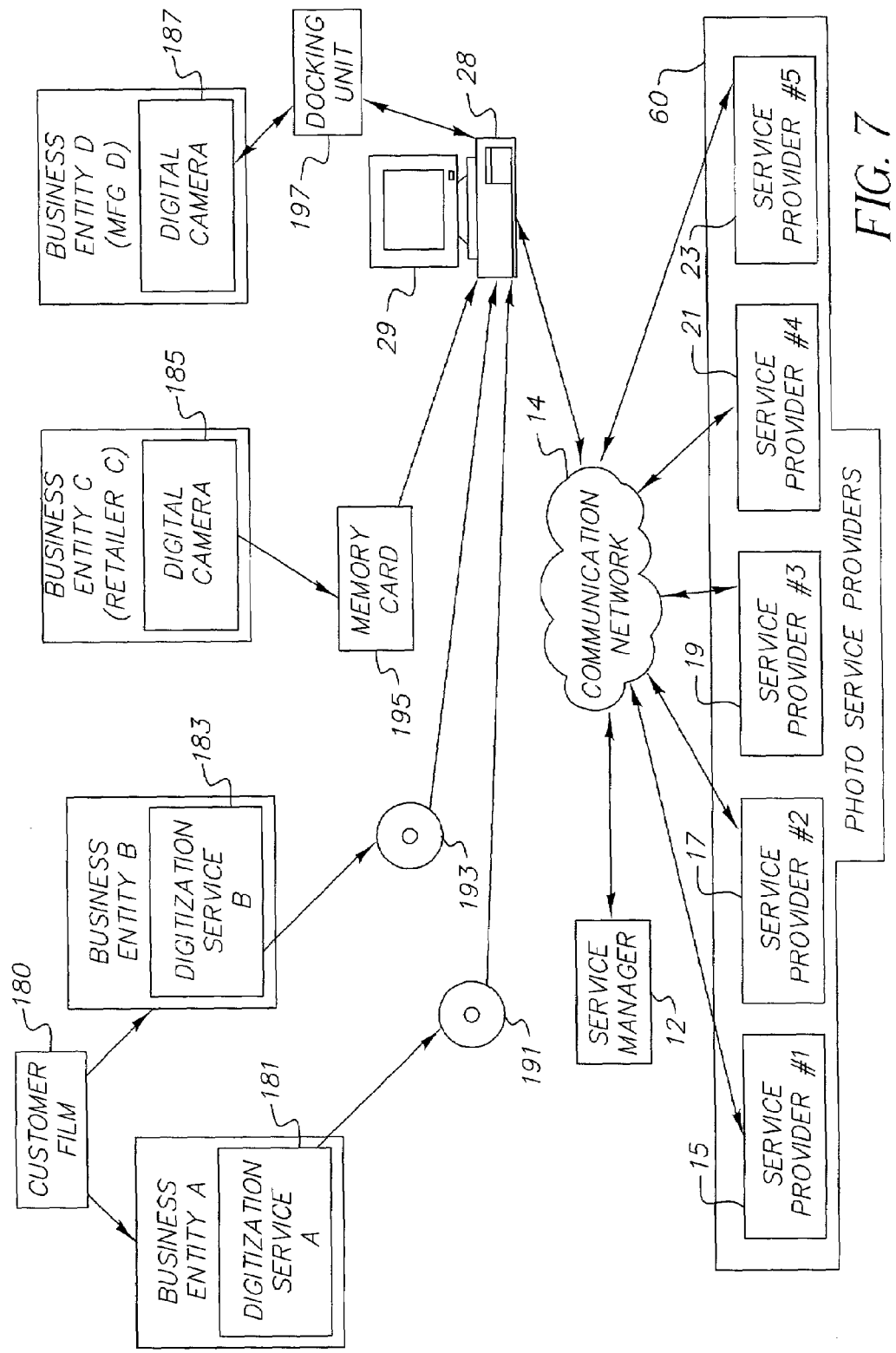
FIG. 7 is a block diagram of a second embodiment of a system made in accordance with the present invention.

FIG. 7 is a block diagram of a second embodiment of a system made in accordance with the present invention. Similar to FIG. 3, photo service providers 60 are connected to a communications network 14. In FIG. 7, however, different business entities are associated with different digital storage devices. These digital storage devices can include Picture CD 191 and Picture CD 193 produced by digitization service 181 associated with business entity A, and digitization service 183 associated with business entity B, respectively, from customer film 180. The Picture CDs 191 and 193 can include both digitized film images and print enabling software to facilitate printing of images stored on the CD, as described in commonly-assigned U.S. Pat. No. 6,208,770 to Gilman et al., the disclosure of which is incorporated herein by reference. In the present invention, the print enabling software stored on the Picture CDs 191 and 193 preferably enables the images to be uploaded from Desktop PC 28 to the photo service providers 60 via communications network 14. These digital storage devices can also include a memory card 195 from a digital camera 185 associated with business entity C, which sold or loaned the camera to the user. These digital storage devices can also include a digital camera 187, associated with business entity D, which manufactured the digital camera 187.

An order terminal, such as Desktop PC 28, connects to the communications network 14, for example using a dial-up modem or a broadband cable or DSL internet connection. The desktop PC 28 includes a CD reader (not shown) that can read images and other information, such as information indicating which business entity is associated with the digitization service, from Picture CD 191 and Picture CD 193. The desktop PC 28 also includes a card reader (not shown) that can read images and other information, such as information indicating which business entity sold the digital camera 185, from memory card 195. The desktop PC 28 also includes a docking unit 197 that can read images and other information, such as information indicating which business entity manufactured the digital camera 187, from the internal memory of digital camera 187.

As described earlier in relation to FIG. 5, a service manager 12 maintains a directory of information with respect to the business relationship between the business entities A-D, and the service providers 15, 17, 19, 21, and 23.

Figure 8:
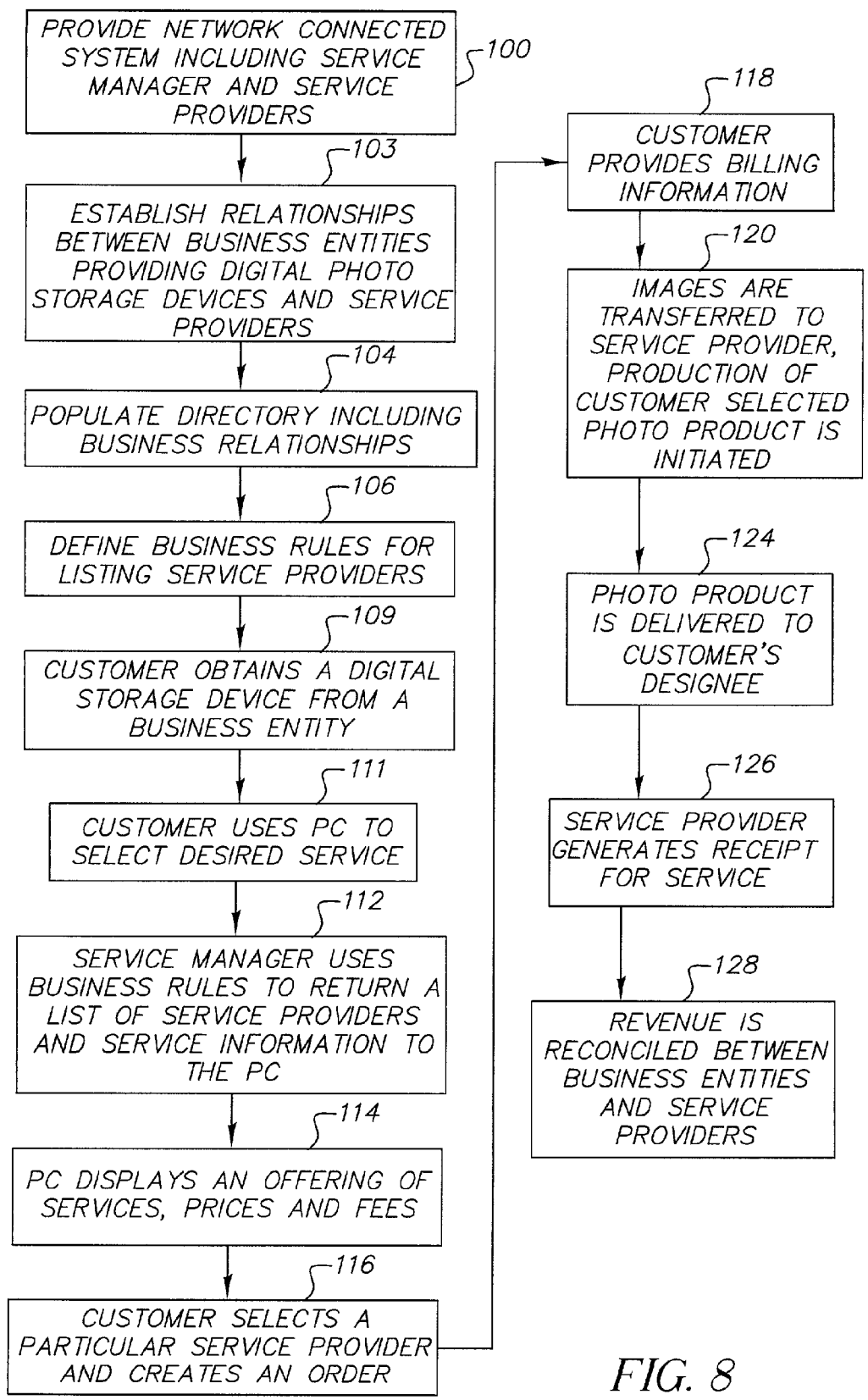
FIG. 8 is a flow diagram of a second embodiment of a method made in accordance with the present invention, using the system of FIG. 7.

FIG. 8 is a flow diagram of a second embodiment of a method made in accordance with the present invention, using the system of FIG. 7. In block 100, the business entities associated with the digital storage devices, the service providers 60, and the parties controlling the service manager 12 agree on the protocols to be followed by the system, as was described earlier in relation to FIGS. 1-2, and introduce network connected equipment and services conforming to these protocols.

In block 102, business relationships are established between the service providers 60 and the business entities associated with the digital storage devices 191, 193, 195, and 187. As described earlier, the business relationships can include a "domestic" relationship, where the same business entity that is associated with the digital storage device is also associated with the service provider. For example, a retailer may both provide digitization services, such as scanning film and producing Picture CDs, and also own or control an on-line photo service provider. In this case, the retailer typically prefers to preferentially feature their "domestic" service provider, when the user later decides to order prints or services using images stored on the Picture CD, from one of the service providers 60.

The business relationships can also include a hostile (e.g. competitive) relationship. For example, both retailer A and retailer B may provide digitization services and also provide on-line photo services. In this case, retailer A might prefer that the software provided on the Picture CD 191 that they produce will preclude users from accessing services provided by hostile retailer B. As described earlier, the business relationships can also include a "friendly" relationship and a "neutral" relationship. A service provider may choose to offer different prices for the same services, depending on the business relationship.

In block 104, the service manager 12 populates and maintains a directory that provides the business relationships between the business entities associated with the digital storage devices 191, 193, 195, and 187, and the service providers 60. The example directory shown earlier as FIG. 5, and the accompanying description, is also applicable to the embodiment shown in FIG. 7.

In block 106, business rules are defined for listing service providers 60 on the order terminals 40, as was described earlier in relation to block 106 of FIG. 4.

In block 109, a customer obtains a digital storage device from a business entity. This can be done by providing exposed customer film 180 to business entity A or B, and purchasing a Photo CD 191 or 193. The Photo CD 191 or 193 includes an identifying code which identifies the business entity (e.g. retailer A or B) from which the customer purchased the Photo CD 191 or 193. It should be noted that in some cases, the same wholesale photofinisher can provide both digitization service A 181 and digitization service B 183, and include the same print enabling software along with the images on the Picture CDs 191 and 193. The only difference is that an identifying code, indicating business entity A is stored on Picture CD 191, and an identifying code, indicating business entity B, is stored on Picture CD 193.

As another example, a customer may purchase a digital camera 185 or 187, and/or a memory card 195 for their digital camera 185, from retailer C or manufacturer D. In this case, the camera or memory card can be programmed with an identifying code indicating which business entity (e.g. which retailer or manufacturer) sold the product. Alternatively, the camera or card may be sold with a software application on a CD-ROM disc (not shown) that identifies the business entity.

In block 111, the customer uses their desktop PC 28 as an order terminal, to select a desired service. For example, the customer inserts PictureCD 191 into a CD reader slot (not shown) in desktop PC 28. The computer display 29 can display thumbnails of the images stored on the PictureCD. The user may desire to make reprints of some or all of the images stored on the PictureCD using one of the service providers 60. To enable these reprints to be made using one of the service providers 60, the Picture CD 191 includes application software which communicates with the service manager 12 via communications network 14.

In block 112, the service manager 12 uses the business rules to return a list of service providers and service information to the desktop PC 28. This service information can include a description of the services provided, one or more icons for the service provider, and price information, as described earlier in relation to block 104 of FIG. 4.

In block 114, the desktop PC 28 serves as order terminal and displays an offering of services, which normally includes the prices/fees for the services. The number and order of the service providers displayed on display 29 of PC 28 depends on the business relationship between the service providers and the business entity associated with the digital storage device which stores the digital images, as provided, for example, in the directory depicted in FIG. 5.

For example, FIG. 6A described earlier in relation to the embodiment of FIG. 3 is also appropriate for the embodiment of FIG. 7, for the case of Picture CD 191 associated with business entity A. As described earlier, a first screen 210 in FIG. 6A includes an icon for the business entity (retailer A). Screen 210 enables a user to select a service, such as standard prints or framed enlargements, or to select an icon to answer questions concerning the system. If the user selects standard prints, screen 212 is displayed. Screen 212 includes icons and information for two printing service providers, provider #1 (retailerA.com) which has a domestic relationship with business entity A, and provider #3 (FOTO.com) which has a neutral relationship with business entity A, as shown in FIG. 5. Screen 212 does not include an icon or information for provider #2 (retailerB.com), which has a hostile relationship with business entity A. The icon and information for provider #1 (retailerA.com) is shown first, since there is a closer relationship with this provider than with provider #3. The prices displayed also correspond to the business relationships.

If a user instead selects framed enlargements, screen 214 is displayed. Since provider #4 (FramesRus) has a friendly relationship with business entity A, while provider #5 (Pictures.com) has a neutral relationship, the services offered by provider #4 are listed first. The friendly business relationship can include providing goods directly from the provider #4 to retailer A, as indicated by the "pickup in 48 hours" statement in screen 214. Furthermore, the price differences between providers #4 and #5 may reflect the different business relationships.

In block 116, the customer selects a particular service provider and creates an order. As mentioned earlier, for a given user, there are many criterion which can affect their selection of a service provider either explicitly or implicitly, and can include any of the following criteria: brand, cost of service, specific product characteristics, delivery time, delivery method, delivery reach, access time, and/or the ability to ship to a specific location. Depending on the photo products and services selected by the user, and the services offered by the selected service provider, it will be understood that the user may be asked to select various images to be used (e.g. printed), the number of copies to make, the print size and finish, etc.

In block 118, the customer provides billing information. In many situations, this is accomplished by the user entering a credit card type, account number, and expiration date.

In block 120, the images are transferred from the digital storage device (such as PictureCD 191) to the service provider, and the customer selected photo products or services are provided.

In block 124, the photo product is delivered to the customer's designee, which may of course be the customer, a different individual, or a location such as a retail store designated by the user.

In block 126, the service provider generates a receipt for the service provided, as described earlier in relation to block 126 of FIG. 4.

In block 128, the revenue received from many customers for providing the photo products or services is reconciled between the business entities and service providers involved in the process of creating the digital images, selling the digitization service or digital camera, selecting the service provider, storing and transferring digital images, and producing and delivering photo products, as described earlier in relation to block 128 of FIG. 4.

Figure 9:
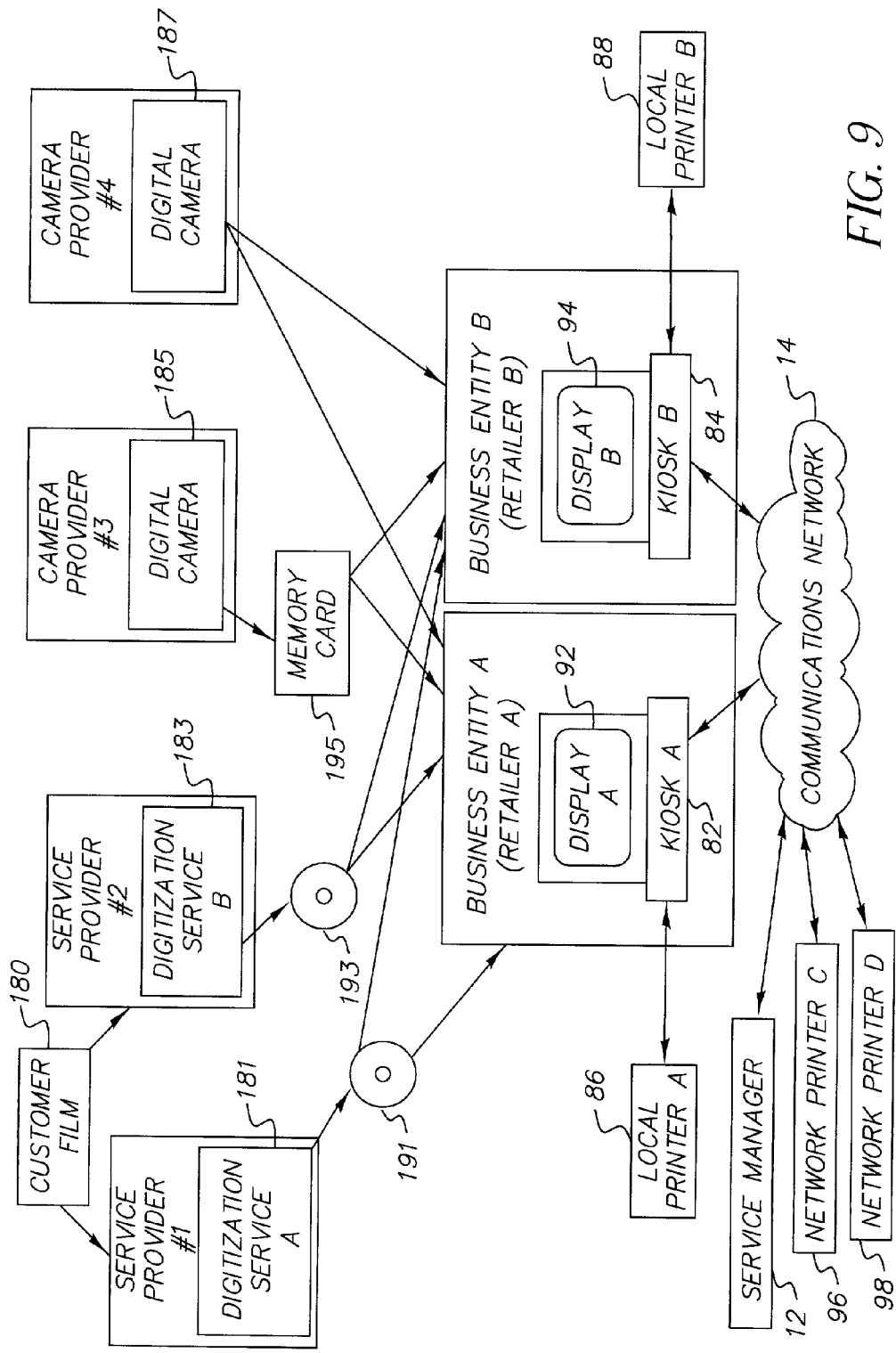
FIG. 9 is a block diagram of a third embodiment of a system made in accordance with the present invention.

FIG. 9 is a block diagram of a third embodiment of a system made in accordance with the present invention. In this system, different business entities are associated with different order terminals. For example, business entity A (retailer A) is associated with photo kiosk order terminal 82, which includes a display 92 and a local printer 86. Business entity B (retailer B) is associated with photo kiosk order terminal 84, which includes a display 94 and a local printer 88. The order terminals 82 and 84 are connected via communications network 14 to network printers 96 and 98.

The order terminals 82 and 84 can read digital images and information from various digital storage devices. These digital storage devices can include Picture CD 191 produced by digitization service 181 associated with service provider #1 and Picture CD 193 produced by digitization service 183 associated with service provider #2, from customer film 180. As described earlier, the Picture CDs 191 and 193 include both digitized film images and a code which identifying the service provider associated with the digital storage device. These digital storage devices can also include a memory card 195 from a digital camera 185 associated with camera provider #3, which sold or loaned the camera to the user and a digital camera 187, associated with service provider #4.

As described earlier, a service manager 12 maintains a directory of information with respect to the business relationship between the business entities A-B, and the service providers #1-#4.

Figure 10:
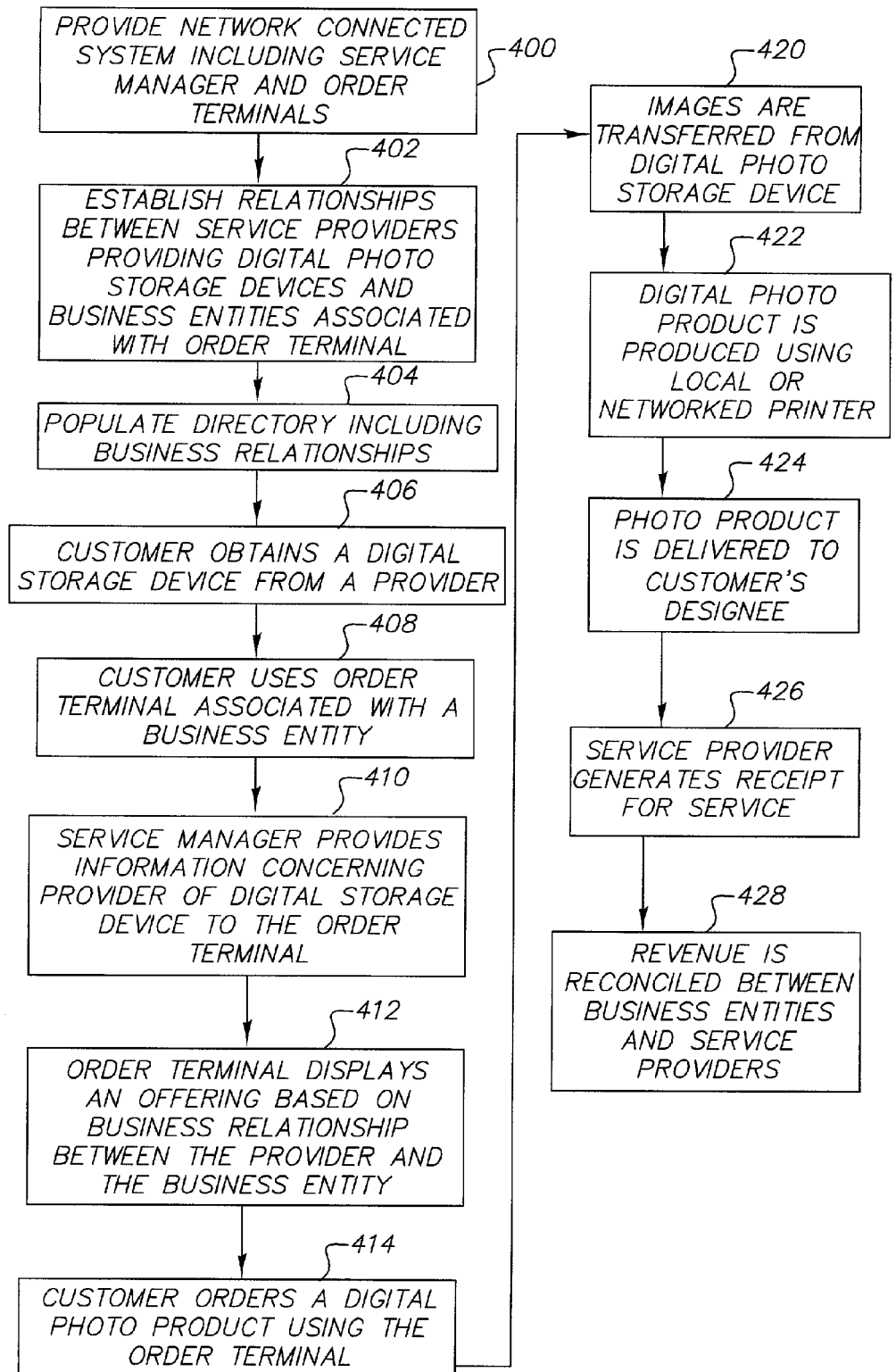
FIG. 10 is a flow diagram of a third embodiment of a method made in accordance with the present invention, using the system of FIG. 9.

FIG. 10 is a flow diagram of a third embodiment of a method made in accordance with the present invention, using the system of FIG. 9. In block 400, the service providers associated with the digital storage devices, and the business entities associated with the order terminals, agree on the protocols to be followed by the system, as was described earlier in relation to FIGS. 1-2, and introduce equipment and services conforming to these protocols.

In block 402, business relationships are established between the service providers associated with the digital storage devices and the business entities associated with the order terminals. As described earlier, the business relationships can include a "domestic" relationship, where the business entity is associated with both the order terminal and the digital storage device. For example, a retailer may both provide digitization services, such as scanning film and producing Picture CDs, and also own or control an on-line photo service provider. In this case, the retailer may wish to provide order terminals which give preferential services and/or prices to users of their digital storage devices.

As described earlier, the business relationships can also include a hostile (e.g. competitive) relationship. For example, both retailer A and retailer B may provide digitization services and also provide order terminals. In this case, retailer A might prefer that their order terminal 82 and local printer 86 preclude users from accessing and printing digital images provided on a digital storage media associated with a service provider with which they have a hostile relationship. As described earlier, the business relationships can also include a "friendly" relationship and a "neutral" relationship. Different order terminals could offer different prices for the same services, depending on the business relationship.

In block 404, the service manager 12 populates and maintains a directory that provides the business relationships between the business entities associated with the order terminals, and the service providers associated with the digital storage devices.

In block 406, a customer obtains a digital storage device from a service provider. As described earlier in relation to FIGS. 7-8, this can be done by providing exposed customer film 180 to service provider #1 or #2, and purchasing a Photo CD 191 or 193. The Photo CD 191 or 193 includes a code that identifies the service provider. A customer may purchase a digital camera 185 or 187, and/or a memory card 195 for their digital camera 185, from camera provider #3 or #4. In this case, the camera or memory card can be programmed with an identifying code indicating which provider (e.g. which retailer or manufacturer) sold the product.

In block 408, the customer uses an order terminal associated with a particular business entity. For example, the customer can bring a digital image storage device, such as PictureCD 191 containing digitized film images, to photo kiosk order terminal 82 and insert it into a CD reader slot (not shown). The display 92 on the photo kiosk order terminal 82 can display thumbnails of the images stored on the PictureCD 191. The user may desire to make reprints of some or all of the images stored on the PictureCD on the local printer 86, or optionally using one of the network printers 96 or 98.

In block 410, the service manager 12 provides information concerning the provider of the digital storage device to the order terminal. This can be done by the order terminal sending the identifying code of the digital storage device to the service manager, and the service manager returning the business relationship between the business entity associated with the order terminal and the service provider associated with the digital storage device. It can optionally include additional service information, such as price information for local printing or a description, icons, and price information for the services that can be provided by network printers 96 and 98.

In block 412, the order terminal displays (e.g. using display 92 of order terminal 82) an offering of products and services, which normally includes the prices for the products and services. The offering, including the prices, depends on the business relationship between the business entity associated with the order terminal, and the service provider associated with the digital storage device which stores the digital images. For example, the price for locally printing images stored on Picture CD 191 can be different than the price for locally printing images stored on Picture CD 193, since there can be different business relationships involved.

In block 414, the customer orders a digital photo product using the order terminal. The photo product may be produced locally (e.g. printed on local printer 86) or produced by service provider connected via communications network 14. In block 420, the images are transferred from the digital storage device (e.g. Photo CD 191). In block 422, the customer selected photo products or services are provided.

In block 424, the photo product is delivered to the customer's designee, which may of course be the customer, a different individual, or a location such as a retail store designated by the user.

In block 426, the service provider generates a receipt for the service provided, as described earlier in relation to block 126 of FIG. 4.

In block 428, the revenue received from many customers for providing the photo products or services is reconciled between the business entities and service providers involved in the process of creating the digital images, selling the digitization service or digital camera, selecting the service provider, storing and transferring digital images, and producing and delivering photo products, as described earlier in relation to block 128 of FIG. 4.

As can be seen from the foregoing, the requester of services now has the ability to quickly retrieve a number of different photo service providers without being restricted to a single brand or type provider nor limited to the type or style of products. In addition, the provider can concentrate on their core competencies and still increase the potential number of customer for it's goods and/or services. In addition, the business entity associated with particular order terminals can ensure that preference is given to service providers with which they have established a preferred business relationship.

As previously described various criteria may be used for finding a suitable provider based on a review of information stored on the system 10 that was provided by the provider. This information can be dynamically changed according to the needs and/or requirements of the provider. Thus, a provider may provide a price list for a particular service and a particular business relationship, that may last for only a short period of time due to a special promotion and/or to meet the work flow requirements of the provider. The system 10 permits the provider to dynamically update the stored information in the services directory 54. The update may occur as frequently as desired, or can be programmed to last for a predetermined time period. For example, a provider may set low price for a given product or service and one hour later change the price to a different price based on a predetermined criterion such as work flow capacity. In addition, if too many orders are received by a provider, for example by having a very attractive price, the system 10 may be configured to automatically forward additional orders to a different provider that the first provider may have a prearranged relationship.

A computer program product can include one or more storage media, for example; magnetic storage media such as magnetic disk (such as a floppy disk) or magnetic tape; optical storage media such as optical disk or optical tape, or machine readable bar code; solid-state electronic storage devices such as random access memory (RAM), or read-only memory (ROM); or any other physical device or media employed to store a computer program having instructions for practicing a method according to the present invention.

It is to be understood that the present invention is not limited to the examples described above ant that various changes may be made without departing from the scope of the present invention, the present invention being defined by the claims that follow.

What is claimed is:

1. A method for ordering digital photo services over a communication network comprising:
   maintaining a registry of a plurality of photo service providers and business entities on a server;
   associating a selection of offerings of goods and services with respect to each of said plurality of photo service providers;
   communicating with a plurality of order terminals over said communications network by said server, each of said order terminals being associated with one of the plurality of business entities, wherein said association identifies said business entity that controls said each of said order terminals;
   maintaining information on said server with respect to business relationships between said plurality of photo service providers and said plurality of business entities;
   transmitting an offer for said desired good or service on behalf of two or more of said plurality of photo service providers from said server to one of said order terminals, wherein said offer presented at said order terminal is based on said business relationships between said business entity who controls said order terminal and said plurality of photo service providers; and
   selecting the desired good or service by a user of said order terminal.

2. The method according to claim 1 wherein said offering is displayed in a presentation format that is also based on said business relationship.

3. The method according to claim 1 wherein said order terminal comprises one of the following:
   an automated teller machine;
   a photo kiosk;
   a personal computer;
   a wireless imaging device;
   a cell phone;
   a personal digital assistance; and
   wireless devices.

4. The method according to claim 1 wherein said plurality of business entities comprises one or more of the following:
   a retail store;
   a manufacturer of an imaging device;
   an automatic teller machine owner.

5. The method according to claim 1 wherein said plurality of photo service providers provide one or more of the following services:
   printing of digital images;
   on-line storage of digital images;
   providing digital storage media containing digital images; and
   providing associated goods and/or services with respect to hard copy prints.

6. The method according to claim 1 wherein said business relationships include friendly, neutral, and hostile relationships.

7. The method according to claim 1 wherein said business relationships are maintained in a services directory by a service manager.

8. A system for facilitating ordering digital photo services over a communication network by a user among a plurality of photo service providers from a plurality of order terminals comprising:
   a control server maintaining a registry of a plurality of service providers and business entities, said control server maintaining information with respect to business relationships between said plurality of photo service providers and said plurality of business entities, and said control server maintaining offerings of goods and services by said plurality of said service providers;

a plurality of order terminals in communication with said control server over said communication network, each of said order terminals being associated at said control server with one of said plurality of business entities, wherein said association identifies said business entity that controls said each of said order terminals;

a communication device of said control system communicating with said plurality of order terminals over said communication network, each of said order terminals being used by said user displaying a selection of offerings with respect to two or more of said plurality of service providers based on said business relationships and the selection of a desired goods or services by said user of said order terminal, wherein said selection of offerings displayed at said order terminal is based on said business relationships between said business entity who controls said order terminal and said plurality of photo service providers.

9. The system according to claim 8 wherein said offering is displayed in a presentation format that is also based on said business relationship.

10. The system according to claim 8 wherein said order terminal being used by said user comprises one of the following:
an automated teller machine;
a photo kiosk;
a personal computer;
a wireless imaging device;
a cell phone;
a personal digital assistance; and
wireless devices.

11. The system according to claim 8 wherein said plurality of business entities comprises one or more of the following:
a retail store;
a manufacturer of an imaging device;
an automatic teller machine owner.

12. The system according to claim 8 wherein said plurality of photo service providers provide one or more of the following services:
printing of digital images;
on-line storage of digital images;
providing digital storage media containing digital images; and
providing associated goods and/or services with respect to hard copy prints.

13. The system according to claim 8 wherein said business relationships include friendly, neutral, and hostile relationships.

14. The system according to claim 8 wherein said business relationships are maintained in a services directory by a service manager.

15. A computer software program having instructions such when loaded on to a computer said program executes a method for ordering digital photo services over a communication network among a plurality of photo service providers from a plurality of order terminals, said program instructions comprising:

maintaining a registry of a plurality of photo service providers and business entities on a server;

associating a selection of offerings of goods and services with respect to each of said plurality of photo service providers;

communicating with a plurality of order terminals over said communications network by said server, each of said order terminals being associated with one of the plurality of business entities, wherein said association identifies said business entity that controls said each of said order terminals;

maintaining information on said server with respect to business relationships between said plurality of photo service providers and said plurality of business entities;

transmitting an offer for said desired good or service on behalf of two or more of said plurality of photo service providers from said server to one of said order terminals, wherein said offer presented at said order terminal is based on said business relationships between said business entity who controls said order terminal and said plurality of photo service providers; and selecting the desired good or service by a user of said order terminal.

* * * * *